US007430636B2

(12) United States Patent
Fujii

(10) Patent No.: US 7,430,636 B2
(45) Date of Patent: Sep. 30, 2008

(54) STORAGE SYSTEM AND STORAGE CONTROL METHOD COMPRISING ROUTER AND SWITCH IN COMMUNICATION WITH RAID MODULES

(75) Inventor: Masanori Fujii, Odawara (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 11/250,420

(22) Filed: Oct. 17, 2005

(65) Prior Publication Data

US 2007/0050546 A1 Mar. 1, 2007

(30) Foreign Application Priority Data

Aug. 29, 2005 (JP) ............................. 2005-247735

(51) Int. Cl.
*G06F 12/00* (2006.01)

(52) U.S. Cl. ...................................... 711/114; 711/112

(58) Field of Classification Search ........................ None
See application file for complete search history.

(56) References Cited

U.S. PATENT DOCUMENTS

| | | | | |
|---|---|---|---|---|
| 6,301,711 | B1 * | 10/2001 | Nusbickel | ..................... 725/93 |
| 6,542,961 | B1 | 4/2003 | Matsunami et al. | |
| 6,826,613 | B1 | 11/2004 | Wang et al. | |
| 2002/0038331 | A1 * | 3/2002 | Flavin | ......................... 709/105 |
| 2003/0101273 | A1 | 5/2003 | Hensbergen | |
| 2004/0177218 | A1 * | 9/2004 | Meehan et al. | .............. 711/114 |

FOREIGN PATENT DOCUMENTS

| | | |
|---|---|---|
| JP | 08-328760 | 12/1996 |
| JP | 10-063576 | 3/1998 |
| JP | 2001-256003 | 9/2001 |
| JP | 2002-123479 | 4/2002 |
| JP | 2003-140837 | 5/2003 |

OTHER PUBLICATIONS

Office Action dated Jan. 23, 2008 from the European Patent Office in corresponding EP application No. 06 250 946.8-1245.
Lauder, P. et al., "Hierarchical Network Routing", Communications for Distributed Applications and Systems, Chapel Hill, Apr. 18-19, 1991, Proceedings of the Conference on Communications Software, New York, IEEE, US, ISBN 0-87942-649-7, Apr. 18, 1991, pp. 105-114, XP010039771.

* cited by examiner

*Primary Examiner*—Reginald G. Bragdon
*Assistant Examiner*—Thanh D Vo
(74) *Attorney, Agent, or Firm*—Mattingly, Stanger Malur & Brundidge, P.C.

(57) ABSTRACT

A storage system comprises a router, which receives and transfers commands; a plurality of RAID modules; and a switch, which receives commands from the router and transmits the commands to any of the plurality of RAID modules. Each RAID module comprises a plurality of media drives, a RAID group is provided by the plurality of media drives. Each RAID module comprises an independent RAID group which does not extend into other RAID groups. In the storage system, the router performs transfer of commands without performing analysis of commands, and a processor within the RAID module performs command analysis.

6 Claims, 7 Drawing Sheets

HOST DEVICE SIDE

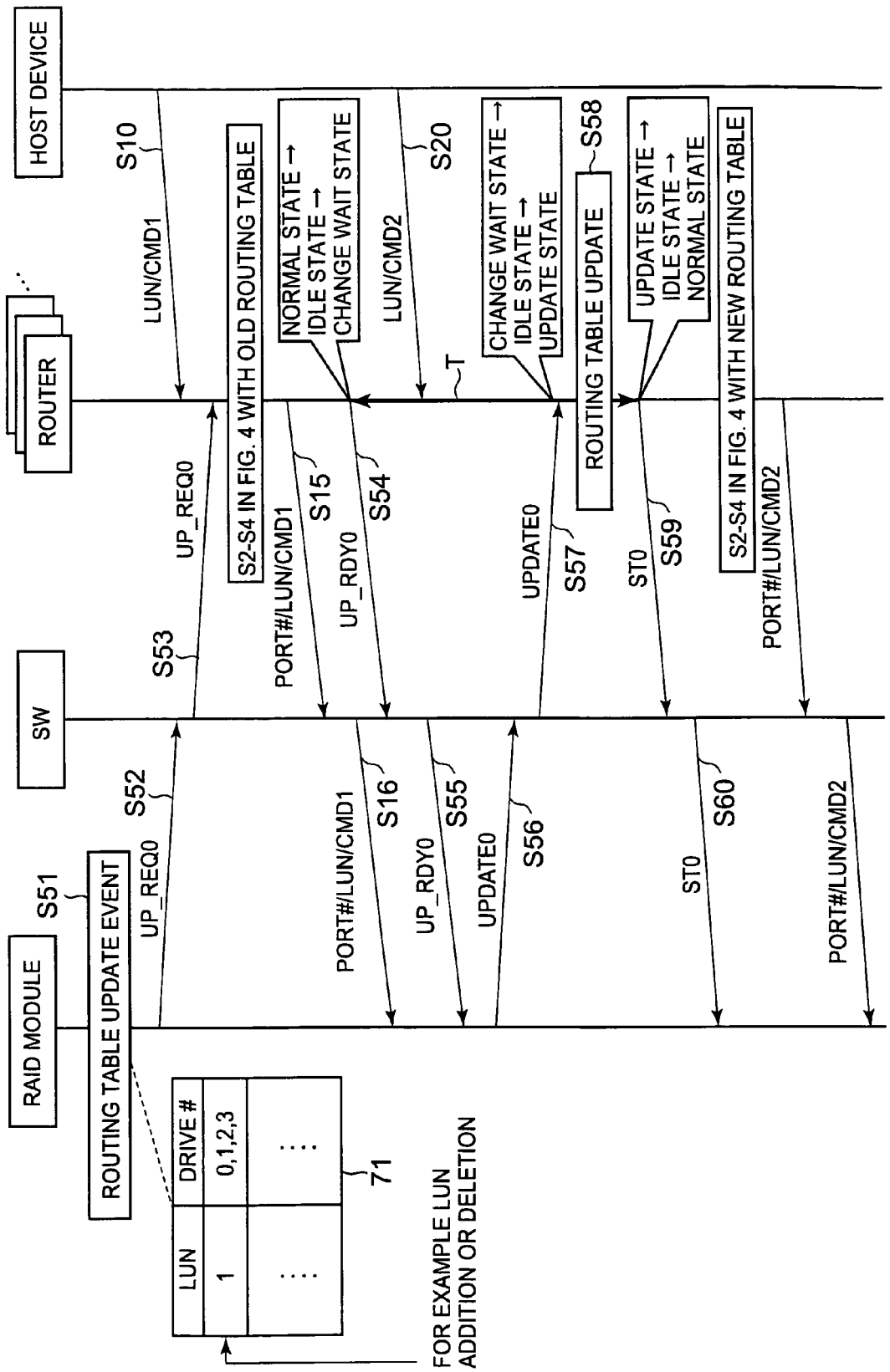

STORAGE SYSTEM AND STORAGE CONTROL METHOD COMPRISING ROUTER AND SWITCH IN COMMUNICATION WITH RAID MODULES

CROSS-REFERENCE TO PRIOR APPLICATION

This application relates to and claims priority from Japanese Patent Application No. 2005-247735, filed on Aug. 29, 2005, the entire disclosure of which is incorporated herein by reference.

BACKGROUND OF THE INVENTION

1. Field of the Invention

This invention relates to storage control technology.

2. Description of the Related Art

Technology related to storage systems includes the disclosures in Japanese Patent Laid-open No. 2001-256003, Japanese Patent Laid-open No. 2003-140837, Japanese Patent Laid-open No. 8-328760, Japanese Patent Laid-open No. 10-63576, and Japanese Patent Laid-open No. 2002-123479.

Architecture which can be applied to storage systems includes, for example, a common memory architecture, and a distributed memory architecture.

According to a common memory architecture, various information related to the storage system is stored in common memory, and any interface board within the storage system (for example, an interface board to a host device, or an interface board to a media drive), can access the information in the common memory. However, as a consequence there is a concentration of accessing of the common memory, resulting in a bottleneck.

According to a distributed memory architecture, there exist a higher-level router/switch portion, which has routing and switching functions, and a plurality of lower-level modules divided in a RAID configuration. The higher-level router/switch portion receives commands from host devices, analyzes the commands, judges which of the plurality of modules should be accessed, and can access one or more modules among the plurality of modules. However, as a result the load on the router/switch portion becomes excessive. Also, because a single RAID configuration is provided through a plurality of modules, when a malfunction occurs in one module, the RAID configuration is disrupted even if the other modules operate normally.

Hence one object of the invention is to provide novel storage control technology which resolves the problems of both common memory architectures and distributed memory architectures.

Other objects of the invention will become clear from the ensuing explanation.

SUMMARY OF THE INVENTION

A storage system of this invention comprises a router, which receives and transfers commands from an external device existing outside the storage system; a plurality of RAID modules; and a switch which receives commands from the router and transfers the commands to any of the plurality of RAID modules. Each RAID module comprises a plurality of media drives; a logical unit in accordance with the RAID group provided by the plurality of media drives; memory which can store data received from the external device, and data read from the logical unit via the switch; and a processor. The processor writes data stored in the memory to the logical unit, or reads data stored in the memory to the switch, according to commands received from the external device. In this storage system, each RAID module comprises an independent RAID group which does not extend into other RAID modules. The external device may be a host device, or may be another storage system.

In one aspect of the invention, the router can transfer the command without analyzing the command (without, for example, discriminating between write commands and read commands). In this case, the processor within each of the RAID modules performs analysis of the command, and can execute processing according to the result of the analysis.

In one aspect of the invention, the router can comprise a command transfer circuit (for example, transfer means) which controls transfer of the commands without performing analysis of the commands, and a storage area (for example, storage means) which can store transfer control information for control of command transfer. In the transfer control information, path data used to specify the transfer destination of a command can be associated with logical unit IDs used to identify logical units. The command transfer circuit can receive a logical unit ID and command from the external device, can specify the path data associated with the logical unit ID from the transfer control information, and can transfer the received command based on the path data thus specified.

Each of the RAID modules can comprise a storage resource (for example, storage means) which can store each of the logical unit IDs representing each of the logical units existing in the RAID module. When there is an update of a logical unit ID in the storage resource, each RAID module can (for example, by means of the processor therein), transfer to the switch an update request and the logical unit ID related to the update. The switch can transmit the update request and the logical unit ID related to the update to the router. The router can receive the update request and the logical unit ID related to the update, and can use the received logical unit ID to update the transfer control information according to the update request.

Here, the router can comprise a buffer. Even upon receiving an update request, the router can accept a command from the external device, and upon receiving a command from the external device, can accumulated the received command in the buffer; and when updating of the transfer control information ends, each of the commands accumulated in the buffer can be transferred based on the updated transfer control information.

The RAID modules can also broadcast the update requests.

In one aspect of the invention, each of the RAID modules can comprise configuration information representing the association between the logical unit IDs and the media drive IDs (for example, comprising configuration information storage means). The configuration information in each RAID module need only comprise the respective IDs of the logical units and media drives existing in the RAID module containing the configuration information; there is no need for the information to comprise the respective IDs of the logical units and media drives existing in other RAID modules. The processor specifies media drive IDs associated with a logical unit ID received from the switch using the configuration information, and can access the media drives associated with the media drive IDs thus specified.

BRIEF DESCRIPTION OF THE DRAWINGS

FIG. 5 shows an example of the flow of processing to update the routing table, performed in the storage system 3;

DESCRIPTION OF THE PREFERRED EMBODIMENTS

Figure 1A:
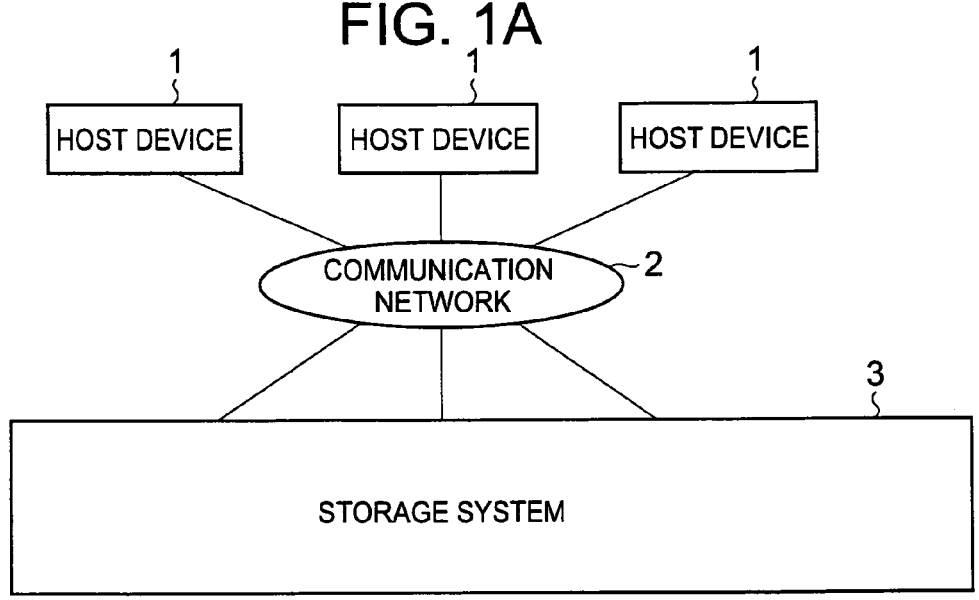
FIG. 1A shows an example of the configuration of the overall system of a first aspect of the invention.

Below, aspects of the invention are explained, referring to the drawings.

FIG. 1A shows an example of the configuration of the overall system of a first aspect of the invention.

A plurality of (or a single) host devices 1, 1, . . . and a storage system 3 are connected to enable communication via a communication network 2.

A host device 1 is a computer device (for example a server machine) comprising for example a CPU, memory, display device, and other hardware resources. A host device 1 can transmit read commands for data to be read, and write commands together with data for writing, to the storage system 3.

As the communication network 2, various networks can be adopted; for example, the communication network 2 can be a SAN (Storage Area Network) or a LAN (Local Area Network).

The storage system 3 can for example be a disk array system such as a RAID (Redundant Array of Independent Inexpensive Disks) system, in which numerous media drives are arranged in an array.

Figure 1B:
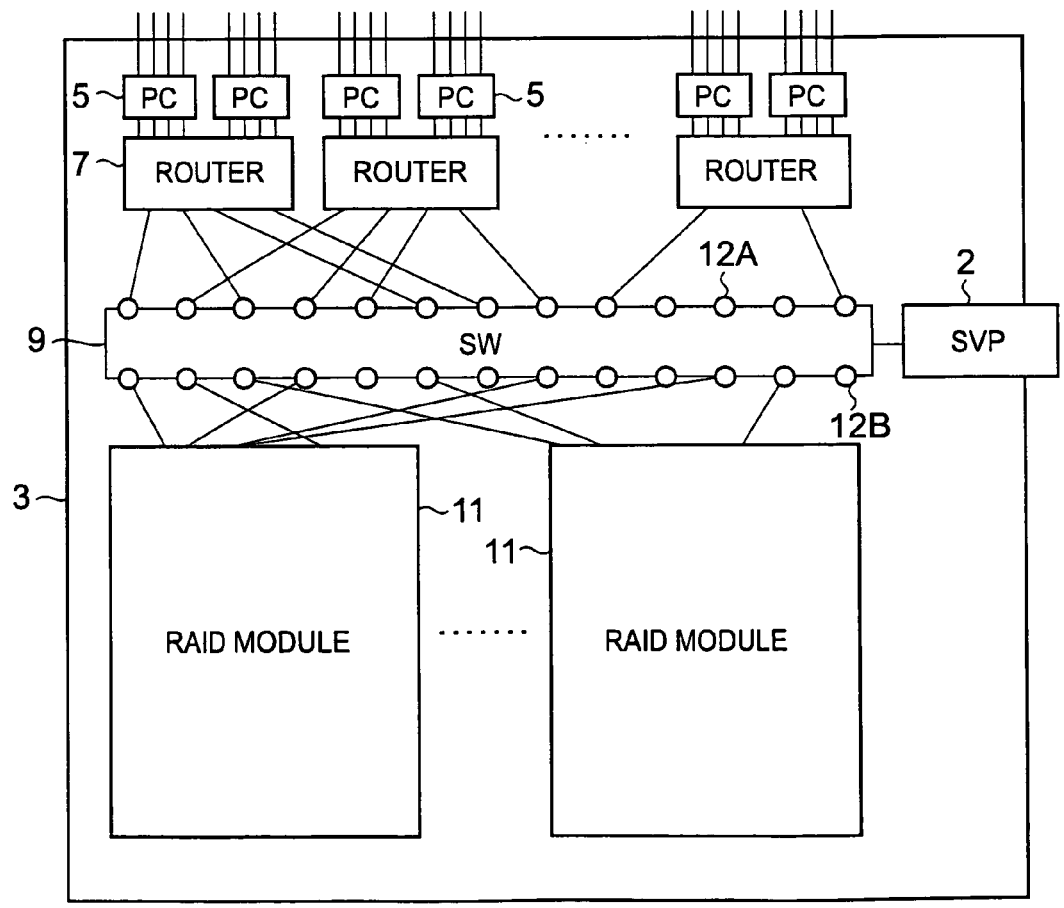
FIG. 1B shows an example of the configuration of the storage system 3.

FIG. 1B shows an example of the configuration of the storage system 3.

The storage system 3 comprises a plurality of protocol chips (abbreviated "PC" in the figure) 5, 5, . . . , a plurality of routers 7, 7, . . . , a switch (hereafter "SW") 9, a plurality of RAID modules 11, 11, . . . , and a service processor (hereafter "SVP") 22. One or more among the protocol chips 5, routers 7, and RAID modules 11 may be singular rather than plural.

The protocol chips 5 are circuits which perform protocol conversion of commands transmitted between host devices 1 and routers 7.

The routers 7 receive commands which have been protocol-converted by protocol chips 5 (including cases in which data is received in addition to a command), and perform path control for the commands. The routers 7 may incorporate the above-described protocol chips 5.

The SW 9 is a device which switches connections between the routers 7, RAID modules 11, and the SVP 22. The SW 9 can for example be a crossbar SW. The SW 9 comprises two or more ports 12A, 12A, . . . connected to routers 7, and two or more ports 12B, 12B, . . . , connected to RAID modules 3.

A RAID module 11 is a package (in other words, a group) having cache memory, a processor and similar, and has a RAID configuration which does not depend on other RAID modules 11. That is, the RAID configuration existing in a RAID module 11 is independent of the other RAID modules 11, and is not disrupted even if malfunctions occur in other RAID modules 11. The RAID configuration can for example be a RAID group (for example, one or a plurality of logical units (hereafter "LUs")), set according to a prescribed RAID level (for example, RAID level 5).

The SVP 22 is a device which can access each of the routers 7 and RAID modules 11 via the SW 9. Specifically, the SVP 22 is a terminal for maintenance which can for example comprise an input device (for example a keyboard or mouse) operated by a manager, a control device (for example a motherboard equipped with a CPU or similar) which executes processing according to operations by the manager, and a display device (for example a display monitor) which displays information set in RAID modules 11 and routers 7. The SVP 22 may be provided in the storage system 3, or may be provided remotely via a LAN or other communication network. The functions of the SVP 22 may also be provided in at least one of the host devices 1; such a host device 1 may, as a SVP 22, control the storage system 3.

The above is a summary of the storage system 3. In this aspect, in order to facilitate the following explanation, each of the routers 7 is connected to all of the RAID modules 11 via the SW 9; in other words, each of the RAID modules 11 is connected to all of the routers 7 via the SW 9.

Below, various components comprised by the storage system 3 are described in detail.

Figure 2A:
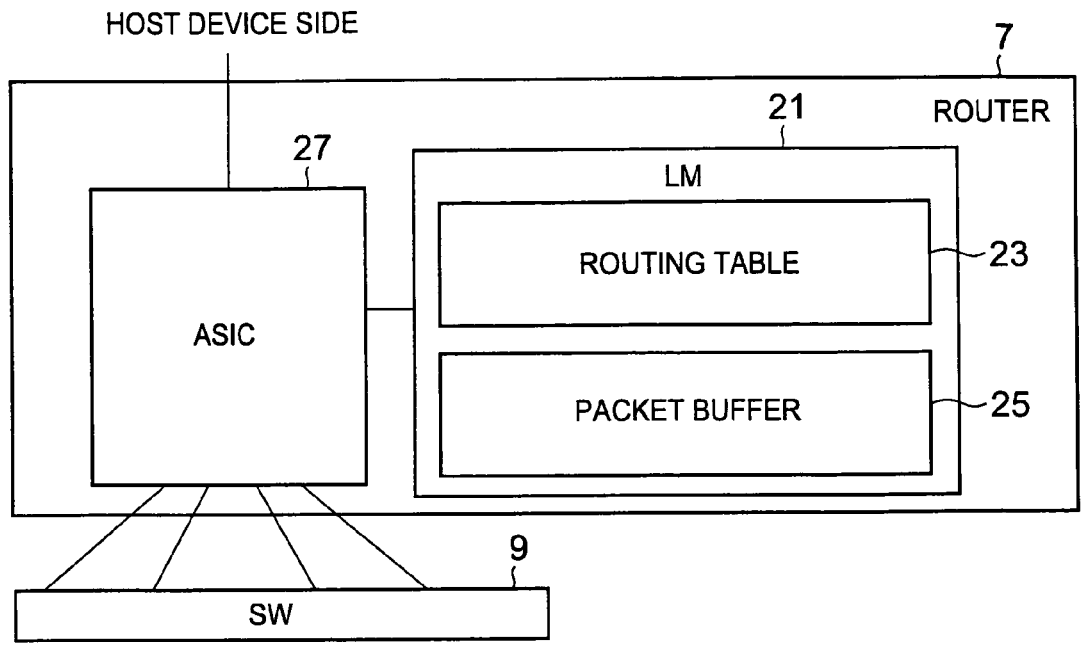
FIG. 2A shows an example of the configuration of the router 7.

FIG. 2A shows an example of the configuration of a router 7.

A router 7 does not comprise a CPU, and does not analyze commands received from a host device 1. This represents one innovation introduced into the storage system 3. A router 7 is, for example, one type of circuit board, comprising local memory (hereafter "LM") 21 and an ASIC (Application-Specific Integrated Circuit) 27.

Figure 2B:
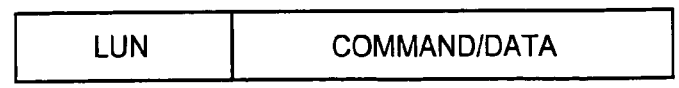
FIG. 2B shows an example of the configuration of the routing table 23.

The LM 21 is volatile or nonvolatile memory. The LM 21 is provided with a packet buffer 25 to temporarily accumulate packet groups (including commands and/or data) exchanged with the router 7, for example. The LM 21 can also store a routing table 23. The routing table 23 is information used to control the path (in other words, the transfer destination) of commands and data from a host device 1. As for example shown in the example of FIG. 2B, a plurality of information element sets may be registered in a routing table 23. Each of the information element sets contains a logical unit number (hereafter "LUN") and a port number (hereafter "port#"). A LUN is a number (and may be some ID other than a number) used to determine the LU. A port # is the number of a port 12A connected to the router 7 among the plurality of ports comprised by the SW 9. IDs other than numbers may be used for both LUNs and for port #'s.

Figure 2C:
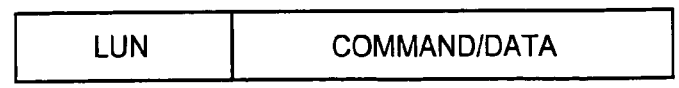
FIG. 2C shows an example of the configuration of a first packet group received by the router 7 from the host device 1.
Figure 2D:
FIG. 2D shows an example of the configuration of a second packet group transmitted by the router 7 to the SW 9.

The ASIC 27 is a LSI (Large Scale Integration) device which controls transfer of packet groups. This ASIC 27 can be implemented entirely as a hardware circuit. The ASIC 27 receives a first packet group (for example, information containing a LUN and command), an example of which appears in FIG. 2C, via a protocol chip 5 from the host device 1, and transmits to the SW 9 a packet group with port # appended (a packet group such as that shown in FIG. 2D; hereafter called a "second packet group"). The processing performed by the ASIC 27 is explained in detail below, referring to FIG. 4.

Figure 3A:
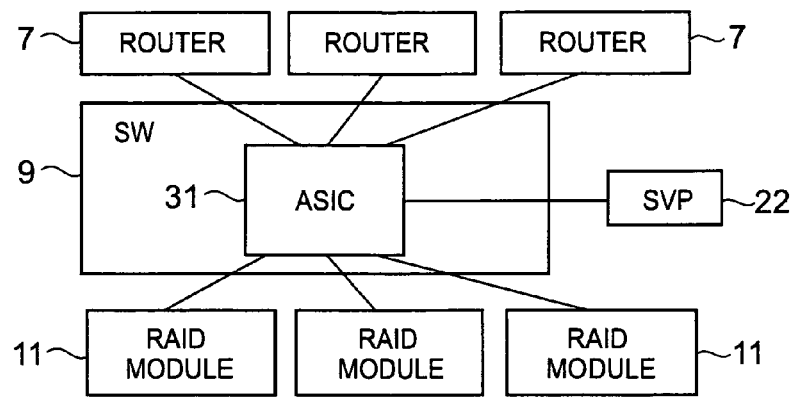
FIG. 3 shows an example of the flow of processing performed in a normal read method.

FIG. 3A shows an example of the configuration of the SW 9.

The SW 9 is provided with an ASIC 31 which controls transfer of packet groups exchanged between the router 7 and a RAID module 11. The ASIC 31 can be connected to the SVP 22. The SVP 22 can access each of the routers 7 and each of the RAID modules 11 via this ASIC 31.

Figure 3B:
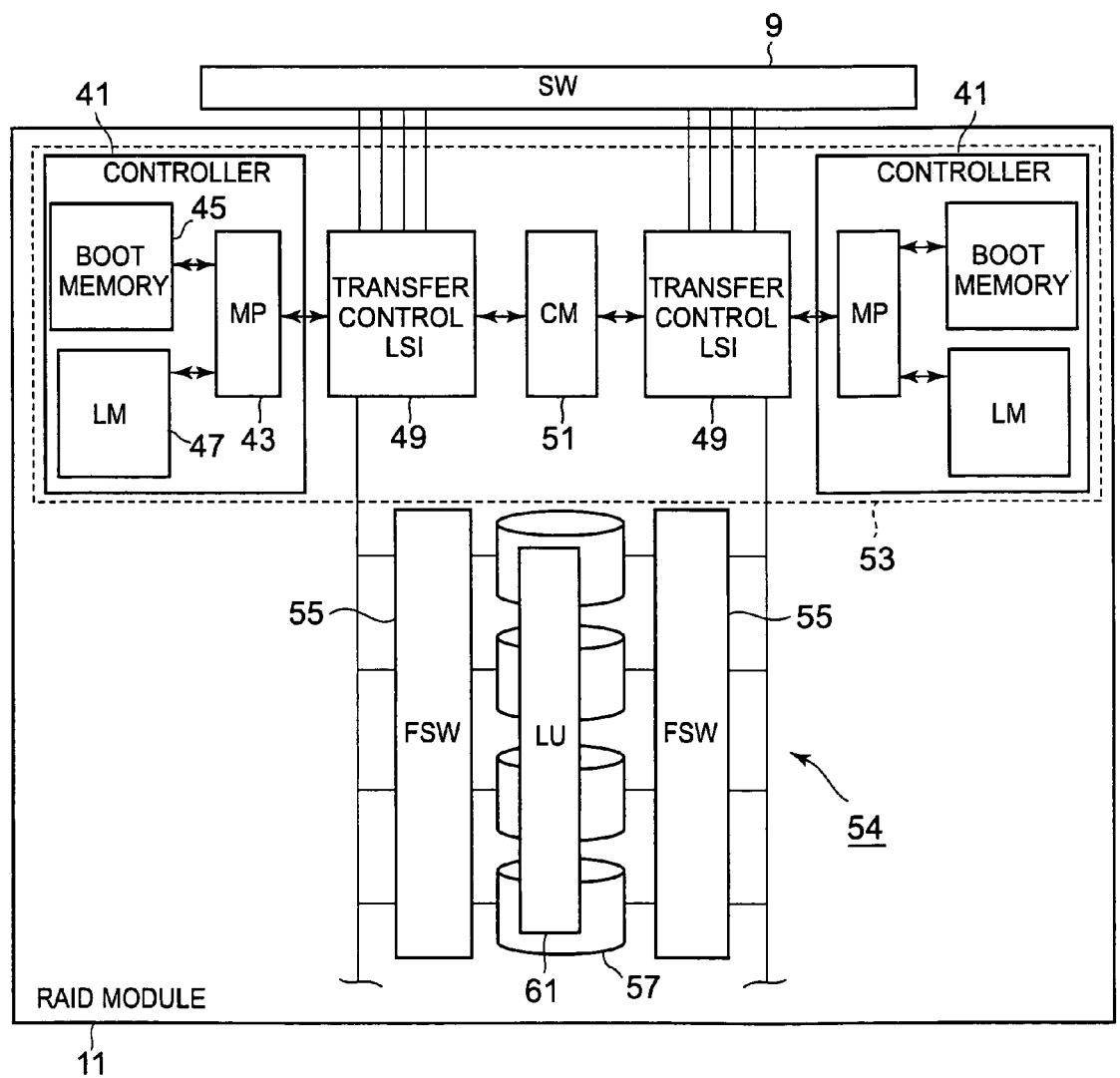

FIG. 3B shows an example of the configuration of a RAID module 11.

The RAID module 11 comprises a plurality of media drives 57, 57, . . . , and the access paths to each media drive 57 are dual-redundant. A media drive 57 is a device comprising storage media on which data can be stored, and may for example be a hard disk drive. A RAID module 11 comprises a control portion 53 and storage portion 54.

The control portion 53 comprises cache memory (hereafter "CM") 51, dually-redundant transfer control LSIs 49, 49, and dually-redundant disk controllers 41, 41. The control portion 53 can for example comprise one or a plurality of circuit boards.

The CM 51 is memory which can store data exchanged between routers 7 and media drives 57. The CM 51 can also store configuration information relating to the configuration of the RAID module of which it is a part (hereafter the "relevant module") 11. In other words, because the relevant RAID module 11 is independent of the other RAID modules 11, the CM 51 need not store configuration information relating to the other RAID modules 11.

The transfer control LSI 49 is for example a hub, and controls transfer of packet groups between the CM 51, controller 41, media drives 57, and the SW 9.

The controller 41 controls the input and output of data to and from each of the media drives 57. The controller 41 comprises, for example, a microprocessor (hereafter "MP") 43, boot memory 45, and LM 47. The boot memory 45 stores a program used to start the MP 43. The MP 43 can be started by reading this program from the boot memory 45. The MP 43 can read a control program from LM 47, for example, and can execute the control program to realize storage virtualization functions (for example, a function to present two or more media drives 57 to the host device 1 as a single storage resource). The LM 47 is used as a work area of the MP 43. The LM 47 may store configuration information in place of the CM 51.

The storage portion 54 comprises the above-described plurality of media drives 57, and a switch to control communication of each of the media drives 57 with the control portion 53 (for example, a fibre channel switch (hereafter "FSW") 55). A logical unit (LU) 61, which is a logical storage device, is set in the plurality of media drives 57. FIG. 3B shows one LU 61; of course, a plurality of LUs 61 can be set.

Below, the flow of various kinds of processing in the storage system 3 is explained.

Figure 4:
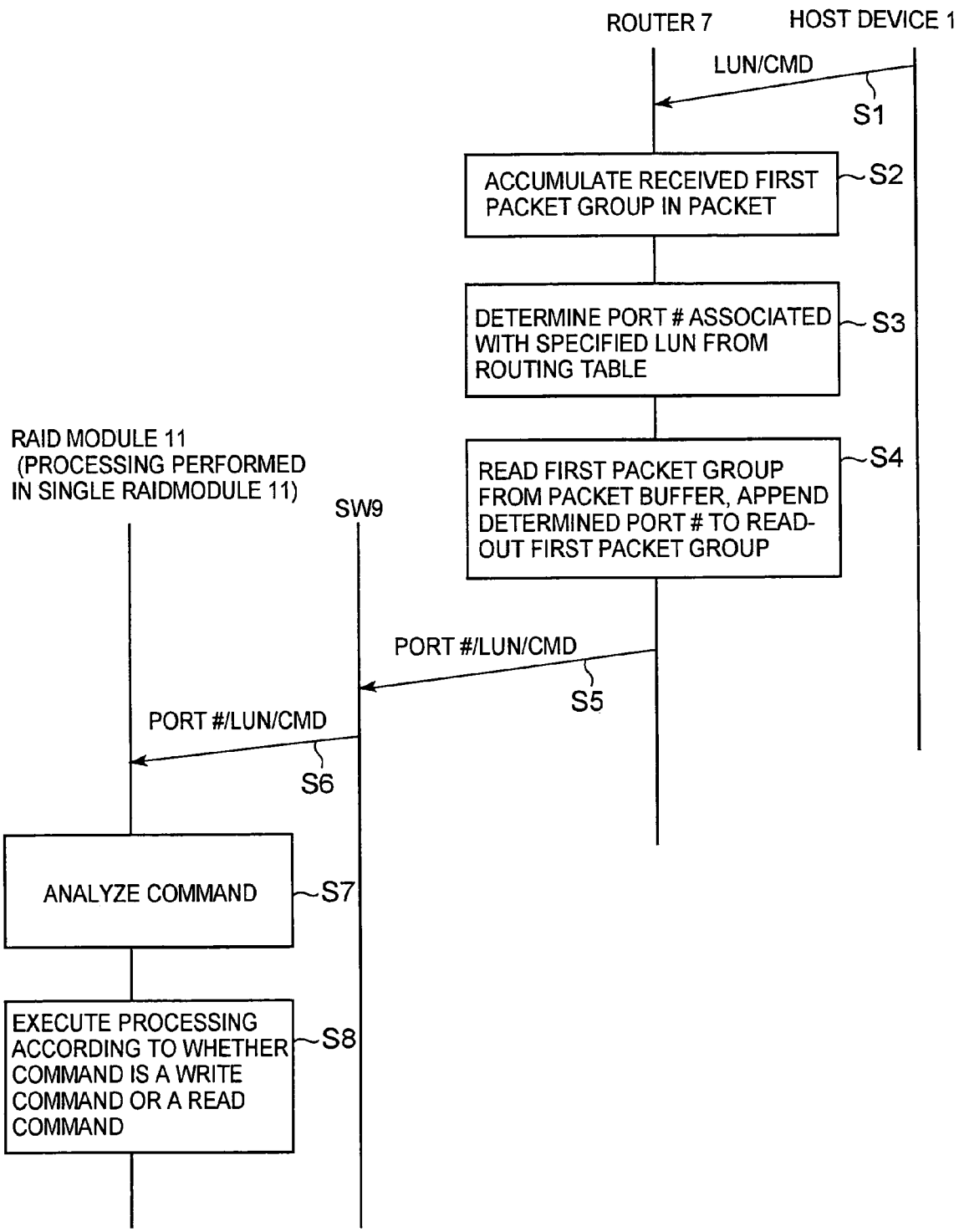
FIG. 4 shows an example of the flow of processing performed when the storage system 3 receives a command from the host device 1.

FIG. 4 shows an example of the flow of processing performed when the storage system 3 receives a command from a host device 1.

The host device 1 transmits the first packet group to the storage system 3 (step S1). Specifically, for example, the host device 1 transmits to the storage system 3 a command (for example, a write command or a read command) which specifies a LUN as the access destination (for example, for data writing or reading).

A router 7 of the storage system 3 receives the first packet group from the host device 1 via a protocol chip 5. The ASIC 27 of the router 7 accumulates the received first packet group in the packet buffer 25 within the LM 21 (S2).

Then, the ASIC 27 uses the routing table 23 to determine the port # associated with the LUN within the first packet group (S3). Specifically, for example, the ASIC 27 determines the port # associated with a port 12A corresponding to the LUN in the first packet group, and which is not in a busy state.

The ASIC 27 reads the first packet group from the packet buffer 25, appends the port # determined in S3 to the first packet group thus read to create the second packet group (S4), and transmits the second packet group to the port 12A of SW 9 corresponding to the port # (S5).

The ASIC 31 of the SW 9 receives the second packet group via a certain port 12A, and transmits the second packet group thus received to the RAID module 11 connected to the port 12B associated with the certain port 12A, via the port 12B (S6).

In the RAID module 11 which has received the second packet group, the transfer control LSI 49 transfer the command within the second packet group to the controller 41. If data for writing is contained within the second packet group, the transfer control LSI 49 writes the data for writing to the CM 51.

The MP 43 of the controller 41 receives the command from the transfer control LSI 49, and analyzes the received command (S7). Specifically, for example, the MP 43 discriminates whether the received command is a write command or a read command.

Within the RAID module 11, processing is executed according to whether the result of discrimination by the MP 43 indicates a write command or a read command (S8).

When for example the MP 43 discriminates a read command, the MP 43 can issue a request to each media drive 57 comprised by the LU 61 associated with the LUN in the second packet group for the data to be read, specified by the read command. The media drives 57 comprised by the LU 61 can for example be determined by referencing the configuration information 71 (see FIG. 5), which records the association between LUNs and media drive IDs. The requested data is read from a media drive 57 receiving the request, and the read data is written to the CM 51 via the transfer control LSI 49. The data is then read from the CM 51 and sent to the port 12B from which the second packet group was output, via the transfer control LSI 49. By this means, the read-out relevant data is transmitted to the host device 1 from which the read command was issued, via the SW 9 and router 7.

On the other hand, when the MP 43 discriminates a write command, the MP 43 causes the transfer control LSI 49 to write the data for writing written to the CM 51 to a media drive 57 comprised by the LU 61 associated with the LUN in the second packet group. By this means, the data for writing written to the CM 51 is written to a media drive 57 comprised by the LU 61, via the transfer control LSI 49.

The above is one example of the flow of processing performed when a command is received by the storage system 3 from a host device 1. According to this processing, a routing table 23, in which transfer paths are associated with each LUN, is set in the router 7. The router 7 uses the routing table 23 to identify the transfer path associated with the LUN specified by the host device 1, and sends the command over this transfer path. Specifically, a port # of the port 12A of the SW 9 is set as the transfer path. When the port 12A is determined, the port 12B to become the outlet for the command from the SW 9 is determined, and when the port 12B is determined, the RAID module 11 which is the destination of the command is determined. In the RAID module 11, information indicating which media drive 57 in the LU 61 of which LUN is associated is managed as configuration information 71, and if a LUN and command are transmitted to the RAID module 11, the command can be analyzed by the RAID module 11, and the media drive 57 which provides the LU 61 corresponding to the LUN can be accessed accordingly. Hence in this aspect, the path to the media drive 57 is determined from the LUN received by the router 7.

In this aspect, there may occur events (hereafter, "routing table update events") in which updating of the routing table 23 held by the router 7 is necessary. This event entails updating of the information relating to information elements written in the routing table 23; specifically, for example, LUNs in a RAID module may be added, modified, or deleted. Specific examples of the occurrence of such an event include the loading of configuration information 71 from the SVP 22 or similar, updating of configuration information 71 by the SVP 22 or similar, and the addition or removal of a RAID module 11.

When a routing table update event occurs, processing is performed in the storage system 3 to update the routing table.

FIG. 5 shows an example of the flow of processing in the storage system 3 to update a routing table. In FIG. 5, steps relating to processing for routing table updating are represented by numbers beginning with 50, and steps relating to transfer of commands from a host device 1 are represented by numbers from 10 to 30.

The MP 43 within a RAID module 11 can detect the occurrence of a routing table update event (S51). Specifically, for example, when the MP 43 loads configuration information 71 from the SVP 22 and writes the information to CM 51 (or LM 47), or when a LUN is added to, modified in, or deleted from configuration information 71 existing in CM 51, the above event occurs.

The MP 43 broadcasts a table update request (UP_REQ0) (S52). Specifically, the MP 43 outputs a table update request from each port of the RAID module 11. By this means, the table update request is transmitted to all of the routers 7 via the SW 9 (S53). Below, in order to facilitate the explanation, an example is employed in which information is exchanged between a single RAID module 11 and a single router 7.

If the ASIC 27 of the router 7, upon receiving the UP_REQ0, can accept the information to be added to, modified in, or deleted from the routing table 23, then the ASIC 27 can return a status message (UP_RDY0) indicating that updating is possible to the port 12A which was the origin of the UP_REQ0 transmission (S54). When returning the status message (UP_RDY0), the ASIC 27 can switch the state of the router 7 from the normal state, in which a first packet group can be received from a host device 1 and processed, to a state of waiting for update of the routing table 23, via an idle state in which operation is paused (for example, the idle state can be a temporary state). Specifically, for example, each time the ASIC 27 switches the state of the router 7, state data indicating the state after switching can be written to LM 21.

If, before returning the UP_RDY0, the ASIC 27 is in normal state while receiving a first packet group from a host device 1 (S10), the processing from S2 to S4 in FIG. 4 is performed using the old (that is, pre-update) routing table 23. As a result, similarly to S5 and S6 in FIG. 4, the second packet group is transmitted to the RAID module 11 (S15 and S16), and the command in the second packet group is analyzed and similar within the RAID module 11.

From the time of returning the UP_RDY0, the ASIC 27 of the router 7 accumulates first packet groups in the packet buffer 25 even when a first packet group is received from a host device 1; however, the first packet groups are not transmitted to the SW 9 (that is, a time period T begins during which first packet groups are not transmitted to the host devices 1).

An UP_RDY0 returned from an ASIC 27 is sent to the RAID module 11 via the SW 9 (S55).

While confirming the UP_RDY0, the MP 43 of the RAID module 11 transmits the information necessary for update of the routing table 23 (UPDATE0) to the port 12B which was the origin of transmission of the UP_RDY0 (or broadcasts the information) (S56). The information elements comprised by the UPDATE0 can include, for example in the case of addition of a LUN, an instruction to add the LUN (for example a flag), and the LUN to be added. If a LUN is to be deleted, an instruction to delete the LUN (for example, a flag), and the LUN to be deleted, may be comprised. If a LUN is to be modified, an instruction for modification of the LUN (for example, a flag), the LUN before modification, and the LUN after modification, may be comprised. The UPDATE0 is transmitted to the router 7 via the SW 9 (S57).

Upon receiving UPDATE0, the ASIC 27 of the router 7 can put the router 7 into the update state from the update wait state via an idle state, and moreover can update the routing table 23 based on the received UPDATE0 (S58). For example, when the ASIC 27 detects that the UPDATE0 contains an instruction to add a LUN, an information element set of the LUN contained in UPDATE0 and each port # can be added to the routing table 23. In this case, the number of information element sets added can be the same as the number of ports 12A. When for example the ASIC 27 detects that UPDATE0 contains an instruction to delete a LUN, all information element sets containing a LUN which matches the LUN contained in UPDATE0 can be deleted from the routing table 23. And, if for example the ASIC 27 detects that UPDATE0 contains an instruction to modify a LUN, the LUN in the routing table 23 matching the LUN before modification contained in UPDATE0 can be updated to the LUN after modification.

When updating of the routing table 23 ends, the ASIC 27 returns a status message (ST0) indicating the end of updating of the routing table 23 to the port 12A which was the origin of transmission of the UPDATE0 (S59). The ST0 is transmitted to the RAID module 11 via the SW 9 (S60).

At the time the ST0 is returned, the time period T during which a first packet group is not transmitted to a host device 1 ends. At this time, the ASIC 27 can return the state of the router 7 to the normal state from the update state, via an idle state. In this case the ASIC 27 can read first packet groups accumulated in the packet buffer 25, and can determine the port #'s associated with the LUNs of the first packet groups from the new (that is, updated) routing table 23. In other words, the new routing table 23 is used to perform the processing of S3 to S8 in FIG. 4 for the first packet groups (when a first packet group is received after the end of the time period T, processing is from S2 in FIG. 4).

The above is one example of the flow of processing to update a routing table, performed in the storage system 3. This processing flow can also be applied to cases in which a new routing table 23 is set in LM 21. For example, suppose that all port #'s which can be associated are written to a routing table 23 in LM 21 of the router 7, and LUNs are blank. In this case, each RAID module 11 notifies each router 7 of all LUNs recorded in its own configuration information 71, and the ASIC 27 of each router 7, by associating the notified LUNs with port #'s, can construct a routing table 23.

According to the above-described aspect, RAID modules 11 having single RAID configurations are prepared in the storage system 3. A RAID module 11 does not depend on other RAID modules 11. For example, the MP 43 in a RAID module 11 uses CM 51 in the module 11, but does not use the CM 51 in other modules 11. Hence performance which is substantially proportional to the number of RAID modules 11 can be expected.

According to the above-described aspect, expansion and reduction can be performed in units of RAID modules 11. As a result, improved scalability can be expected.

According to the above-described aspect, routers 7 which receive LUNs and commands from host devices 1 are provided on the level above the RAID modules 11. These routers 7 are configured to enable distribution of commands from host devices 1 to the appropriate lower-level transfer destinations, without performing analysis of the commands (for example, discriminating between read commands and write commands). Consequently the processing time in the router 7 is shortened, and so it should be possible to provide high-speed access processing to host devices 1.

According to the above-described aspect, update requests and update information are issued from RAID modules 11 to each of the routers 7. Upon receiving an update request, each router 7 enters a packet transmission pending state, at least until the routing table 23 has been updated. If, while in this state, a router 7 receives a command from a host device 1, the command is accumulated in the packet buffer 25, and after the state is released, commands are distributed according to the updated routing table 23. By this means, it is possible to update LUNs within RAID modules 11, and to update routing tables 23 in each router 7 accordingly, while the storage system 3 accepts first packet groups from host devices 1 (in other words, without halting the issuing of first packet groups by host devices 1).

Figure 6A:
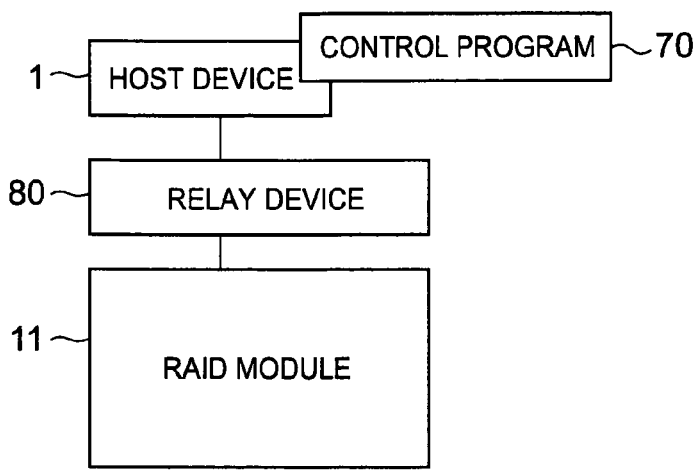
FIG. 6A shows an example of an outbound method.
Figure 6B:
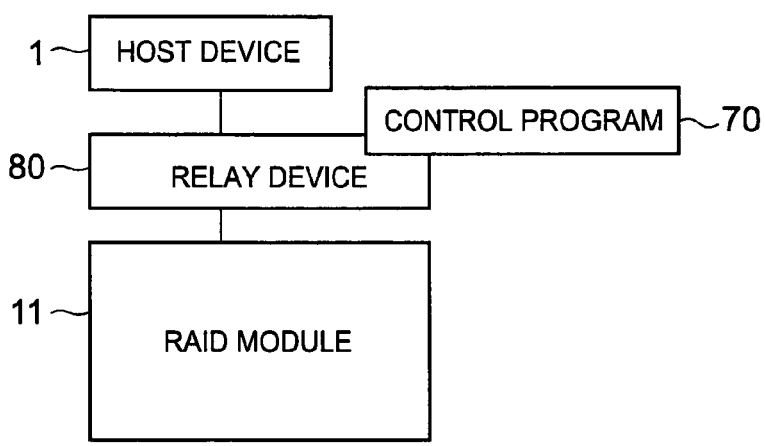
FIG. 6B shows an example of a first inbound method.
Figure 6C:
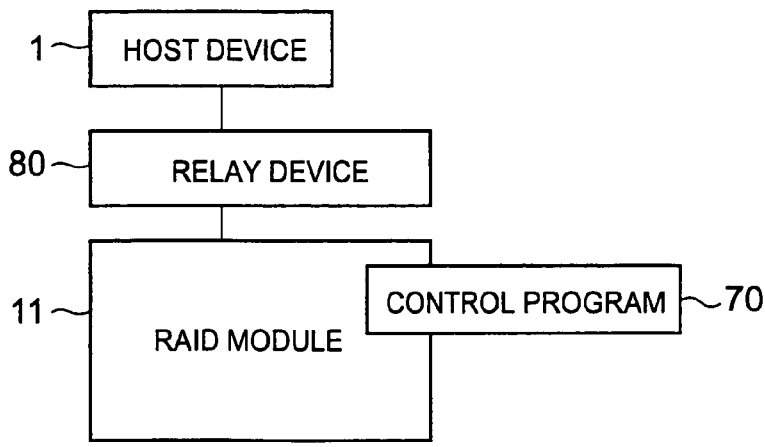
FIG. 6C shows a second inbound method, adopted in this aspect.

According to the above aspect, the method illustrated in FIG. 6C is adopted, that is, an inbound method is employed in which a control program 70 is provided in RAID modules 11 to realize storage virtualization functions. By executing this control program 70, an MP 43 can for example determine the drive # associated with a LUN from the configuration information 71 (see FIG. 5), and can access each of the media drives 57 associated with the LU 61 of the LUN. Such an inbound method can alleviate the problems with the outbound method illustrated in FIG. 6A and with other inbound methods such as that illustrated in FIG. 6B. That is, according to the outbound method illustrated in FIG. 6A, a control program 70 is necessary for each host device 1, so that the cost of introduction is expected to be high. And according to the inbound method illustrated in FIG. 6B, a relay device 80 (for example, the SW 9, a router 7, or a switch existing in the communication network 2) performs command analysis and other processing, so that there are concerns that performance may be degraded. The inbound method illustrated in FIG. 6C can alleviate all of these drawbacks.

In the above, an aspect of the invention has been explained; however, the aspect is an example used to explain the invention, and the scope of the invention is not limited only to this aspect. The invention can be implemented with various modifications.

Figure 7A:
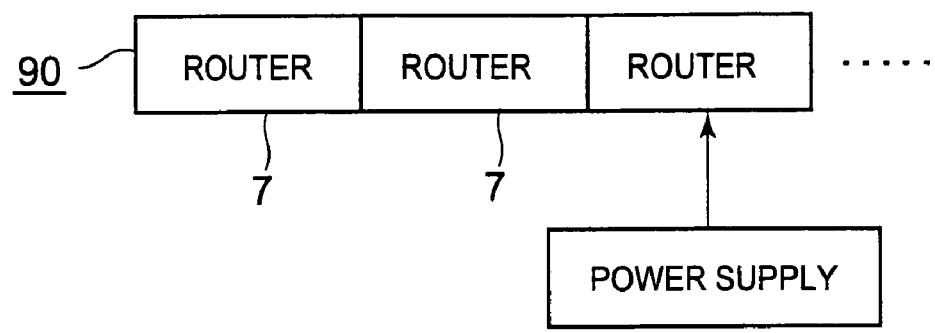
FIG. 7A explains a first modified example of the first aspect of the invention; and, FIG. 7B explains another modified example of the first aspect of the invention.

For example, as illustrated in FIG. 7A, a plurality of routers 7 may be integrated (for example, fabricated on a single circuit board 90). By this means, a plurality of routers 7 can use a common power supply.

Figure 7B:
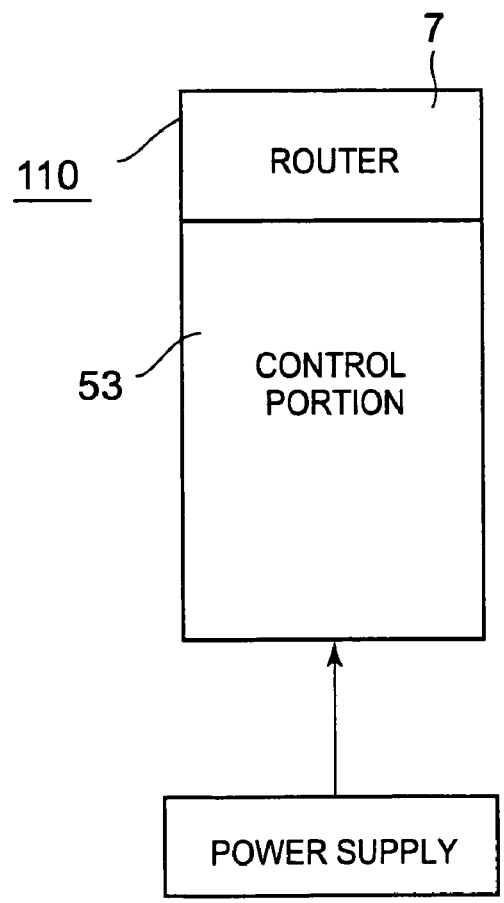

And, as for example illustrated in FIG. 7B, a router 7 and the control portion 53 within a RAID module 11 may be integrated (for example, fabricated on a single circuit board 110). By this means, the router 7 and control portion 53 can use a common power supply.

In addition to LUNs and port #'s, the information element sets registered in a routing table 23 may for example include other information elements. Such other information elements may for example be the drive IDs comprised by the LU associated with a LUN. Also, IDs (for example numbers; hereafter called "module #'s") used to identify the RAID modules 11 which are the transfer destinations of commands may be used. In this case, a router 7 can append, in addition to the port #, the module # to a first packet group from a host device 1, and can transmit this to the SW 9. By this means, a second packet group (containing a port #, module #, and first packet group) is transmitted to the RAID module 11 identified using the module # within the second packet group.

Further, there may for example be a plurality of types of port #'s registered in routing tables 23 and/or port #'s appended to first packet groups. For example, in place of or in addition to the port # of a port 12A, there may be at least one among a port # for a port 12B, a port # for a port (not shown) of a router 7, and a port # of a port (not shown) of a RAID module.

What is claimed is:

1. A storage system, comprising:
a router which receives and transfers commands from an external device existing outside the storage system;
a plurality of RAID modules; and
a switch which transmits commands received from said router to any of said plurality of RAID modules, wherein each RAID module comprises:
a plurality of media drives;
a logical unit in accordance with a RAID group provided by said plurality of media drives;
memory that stores data received from said external device and data read from said logical unit via said switch;
a processor which, according to a command received from said external device, writes data stored in said memory to said logical unit, or outputs data stored in said memory to said switch;
a control program, wherein said control program provides storage virtualization functions; and
a storage resource that stores logical unit IDs which represent each of a plurality of logical unit existing in the RAID module, and, when there is an update of a logical unit ID in said storage resource, said storage resource transmits an update request and a logical unit ID related to the update to said switch,
wherein said switch transmits to said router said update request and said logical unit ID related to said request,
wherein said router receives said update request and said logical unit ID related to the update, and uses said received logical unit ID to update a transfer control information according to said update request,
wherein said router comprises a buffer, and even when said update request has been received, said router accepts commands from said external device, and upon receiving commands from said external device, said router accumulates the received commands in said buffer, and when updating of said transfer control information has ended, said router transfers commands accumulated in said buffer based on the updated transfer control information, and
wherein said RAID group is provided independently so as not to extend into other RAID modules,
wherein each of said plurality of RAID modules comprises configuration information representing an association between each logical unit ID and each media drive of the plurality of media drives, wherein configuration information of each of said plurality of RAID modules comprises respective IDs of logical units and media drives existing in the RAID module comprising the configuration information, and does not comprise the respective IDs of logical units and media drives existing in other RAID modules, and wherein said processor specifies from said configuration information a media drive ID associated with a logical unit ID received from said switch, and accesses a media drive associated with a specified media drive ID.

2. The storage system according to claim 1, wherein said router transfers said received commands without performing analysis of said received commands, and said processor within each of said plurality of RAID modules performs analysis of said received commands, and executes processing according to the result of the analysis.

3. The storage system according to claim 1, wherein said router comprises a command transfer circuit which controls transfer of said received commands without performing analysis of said received commands and a storage area that stores transfer control information to control transfer of said received commands, wherein in said transfer control information, each logical unit ID to identify a logical unit is associated with path data to specify the transfer destination of commands, and wherein said command transfer circuit receives logical unit IDs and commands from said external device, specifies path data associated with the logical unit ID from said transfer control information, and transfers said received commands based on specified path data.

4. The storage system according to claim 3, wherein said RAID modules broadcast said update requests.

5. A storage control method, realized in a storage system, said method comprising:

receiving, by a router, a command from an external device, which is a device existing outside the storage system;

transferring, by said router, said command to any port among a plurality of ports on a switch, without analysis of said command, wherein a command input from a certain port of said switch is output from another port of said switch and transferred to any of a plurality of RAID modules, wherein a processor within the RAID module which has received said command analyzes the command, and accesses the a logical unit, in which the RAID module exists, according to the result of the analysis, wherein each RAID module comprises:

a plurality of media drives;

a logical unit in accordance with a RAID group provided by said plurality of media drives;

a memory that stores data received from said external device and data read from said logical unit via said switch;

said processor which, according to a command received from said external device, writes data stored in said memory to said logical unit, or outputs data stored in said memory to said switch;

a control program, wherein said control program provides storage virtualization functions;

a storage resource that stores logical unit IDs which represent each of the logical units existing in the RAID module, and, when there is an update of a logical unit ID in said storage resource, said storage resource transmits an update request and a logical unit ID related to the update to said switch, wherein said switch transmits to said router said update request and said logical unit ID related to said request, wherein said router receives said update request and said logical unit ID related to the update, and uses said received logical unit ID to update said transfer control information according to said update request, wherein said router comprises a buffer, and even when said update request has been received, said router accepts commands from said external device, and upon receiving commands from said external device, said router accumulates the received commands in said buffer, and when updating of said transfer control information has ended, said router transfers commands accumulated in said buffer based on the updated transfer control information, wherein each of said plurality of RAID modules comprises configuration information representing an association between each logical unit ID and each media drive of the plurality of media drives, wherein configuration information of each of said plurality of RAID modules comprises respective IDs of logical units and media drives existing in the RAID module comprising the configuration information, and does not comprise the respective IDs of logical units and media drives existing in other RAID modules, and wherein said processor specifies from said configuration information a media drive ID associated with a logical unit ID received from said switch, and accesses a media drive associated with a specified media drive ID.

6. A storage system, comprising:

a router which receives and transfers commands from an external device existing outside the storage system;

a plurality of RAID modules; and a switch which transmits commands received from said router to any of said plurality of RAID modules, wherein said router, each of said plurality of RAID modules, and said switch each have a port;

wherein each of said plurality of RAID modules comprises:

a plurality of media drives;

a logical unit in accordance with a RAID group provided by said plurality of media drives;

a memory that stores data received from said external device and data read from said logical unit via said switch;

a processor which, according to a command received from said external device, writes data stored in said memory to said logical unit, or outputs data stored in said memory to said switch;

a control program, wherein said control program provides storage virtualization functions; and a storage resource that stores logical unit IDs which represent each of a plurality of logical units existing in the plurality of RAID modules, and when there is an update of a logical unit ID in said storage resource, said storage resource transmits an update request and a logical unit ID related to the update to said switch, wherein said switch transmits to said router said update request and said logical unit ID related to said request, wherein said router receives said update request and said logical unit ID related to the update, and uses a received logical unit ID to update a transfer control information according to said update request, wherein said router comprises a buffer, and even when said update request has been received, said router accepts commands from said external device, and upon receiving commands from said external device, said router accumulates the received commands in said buffer, and when updating of said transfer control information has ended, said router transfers commands accumulated in said buffer based on the updated transfer control information, wherein said RAID group is provided independently so as not to extend into other RAID modules, wherein said router comprises a command transfer circuit which controls transfer of said received commands without performing analysis of said received commands and a storage area that stores the transfer control information to control transfer of commands, wherein in said transfer control information, each logical unit ID to identify a logical unit is associated with a port ID to identify a port, wherein said command transfer circuit receives a logical unit ID and command from said external device, specifies the port ID associated with the logical unit ID from said transfer control information, appends the specified port ID to a set of the logical unit ID and command, and transfers said set with said port ID, wherein each of said plurality of RAID modules comprises configuration information representing the association between each of said logical unit IDs and each media drive ID of the plurality of media drives, wherein configuration information of each of said plurality of RAID modules comprises respective IDs of logical units and media drives existing within the plurality of RAID modules comprising the configuration information, and does not comprise the respective IDs of logical units or media drives existing in other RAID modules, and wherein said processor receives said set of the logical unit ID and command from said switch, analyzes the command in said received set, specifies a media drive ID associated with the logical unit ID in said received set from said configuration information, and accesses a media drive associated with said specified media drive ID according to the result of analysis of said command.

* * * * *